(12) United States Patent
Krämer

(10) Patent No.: US 8,141,946 B2
(45) Date of Patent: Mar. 27, 2012

(54) SYSTEM FOR ADJUSTING THE POSITION OF AT LEAST ONE SEAT COMPONENT OF A PASSENGER SEAT AND ASSOCIATED COMMON CONTROL UNIT

(75) Inventor: Marco Krämer, Wolpertshausen (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 435 days.

(21) Appl. No.: 11/189,697

(22) Filed: Jul. 29, 2005

(65) Prior Publication Data
US 2006/0103193 A1 May 18, 2006

(30) Foreign Application Priority Data
Aug. 4, 2004 (DE) .......................... 10 2004 037 674

(51) Int. Cl.
*B60N 2/00* (2006.01)
*B60N 2/02* (2006.01)
*B64D 11/06* (2006.01)

(52) U.S. Cl. .................. 297/217.3; 297/232; 297/330; 297/344.17; 297/344.2; 297/362.11; 244/118.6; 244/122 R

(58) Field of Classification Search ............... 297/217.3, 297/232, 344.17, 344.2, 362.11, 330
See application file for complete search history.

(56) References Cited

U.S. PATENT DOCUMENTS

| | | | | |
|---|---|---|---|---|
| 4,313,208 A | * | 1/1982 | Kavenik | 455/42 |
| 5,315,726 A | * | 5/1994 | Borenstein | 5/618 |
| 5,555,458 A | * | 9/1996 | Large | 340/945 |
| 5,795,018 A | * | 8/1998 | Schumacher et al. | 297/217.3 X |
| 5,880,867 A | * | 3/1999 | Ronald | 398/119 |
| 5,984,415 A | * | 11/1999 | Schumacher et al. | 297/217.3 X |
| 6,194,853 B1 | | 2/2001 | Tual et al. | |
| 6,243,635 B1 | * | 6/2001 | Swan et al. | 701/49 |
| 6,669,143 B1 | * | 12/2003 | Johnson | 244/122 R |

(Continued)

FOREIGN PATENT DOCUMENTS
DE 32 42 978 A1 6/1984
(Continued)

OTHER PUBLICATIONS

Search Report dated Nov. 24, 2005 in corresponding European Patent Application No. 05014418.7-2422.

*Primary Examiner* — Rodney B White
*Assistant Examiner* — Joseph Edell
(74) *Attorney, Agent, or Firm* — Posz Law Group, PLC

(57) ABSTRACT

A system (1) for adjusting the position of at least one seat component such as head rest (4), back rest (6), seat component (8), leg rest (10), or foot rest (12) of a passenger seat (2) of a vehicle, an aircraft passenger seat in particular, by means of actuators, a seat control (14, 18) being mounted locally on the aircraft passenger seat (2) and being provided with at least one operating element (15) and data being transmissible between the seat controls (14, 18) of a plurality of passenger seats (2), preferably of all passenger seats (2) of the vehicle, including data relating to the position of the seat components and/or data relating to operation of the actuators, and a common control unit (24; 124), characterized in that the seat control (14, 18) and the common control unit (24; 124) each has a data transmission unit (20, 21, 32, 34, 36) for wireless data transmission and an associated common control unit (24; 124).

23 Claims, 2 Drawing Sheets

U.S. PATENT DOCUMENTS

| | | | |
|---|---|---|---|
| 6,731,088 B2 * | 5/2004 | Nivet | 297/330 X |
| 6,799,805 B2 * | 10/2004 | Johnson | 244/122 R |
| 6,831,565 B2 * | 12/2004 | Wanami et al. | 340/667 |
| 7,137,594 B2 * | 11/2006 | Mitchell et al. | 244/118.6 |
| 7,192,089 B2 * | 3/2007 | Boudinot | 297/362.11 |
| 7,232,094 B2 * | 6/2007 | Bishop et al. | 244/118.6 |
| 7,322,651 B2 * | 1/2008 | Makhsous et al. | 297/217.3 X |
| 7,458,643 B2 * | 12/2008 | Johnson | 297/452.33 |
| 7,501,597 B2 * | 3/2009 | Voltz et al. | 200/298 |
| 7,695,065 B2 * | 4/2010 | Terno et al. | 297/217.3 |
| 7,878,586 B2 * | 2/2011 | Kneller et al. | 297/217.3 X |
| 2002/0070591 A1 * | 6/2002 | Nivet | 297/217.3 |
| 2003/0047983 A1 * | 3/2003 | Wanami et al. | 297/464 |
| 2003/0071504 A1 * | 4/2003 | Nivet | 297/330 |
| 2003/0075964 A1 | 4/2003 | Piaulet et al. | |
| 2003/0114178 A1 * | 6/2003 | Chapelle et al. | 455/517 |
| 2004/0077308 A1 | 4/2004 | Sanford et al. | |
| 2004/0100138 A1 * | 5/2004 | Johnson | 297/452.18 |
| 2005/0039208 A1 * | 2/2005 | Veeck et al. | 725/76 |
| 2009/0152916 A1 * | 6/2009 | Lin et al. | 297/217.3 |
| 2010/0109400 A1 * | 5/2010 | Kneller et al. | 297/248 X |
| 2010/0176632 A1 * | 7/2010 | Alford et al. | 297/217.3 |
| 2011/0068227 A1 * | 3/2011 | Kneller et al. | 244/118.6 |
| 2011/0101739 A1 * | 5/2011 | De Lissandri | 297/217.4 X |

FOREIGN PATENT DOCUMENTS

| | | |
|---|---|---|
| DE | 37 19 105 A1 | 12/1988 |
| DE | 195 32 919 A1 | 3/1997 |
| DE | 198 36 060 A1 | 12/1999 |
| DE | 10209759 A1 * | 9/2003 |
| EP | 0 549 541 A1 | 6/1993 |
| FR | 2696384 A1 * | 10/1992 |
| GB | 2 334 673 A | 9/1999 |
| WO | WO 02/18 207 A1 | 3/2002 |

* cited by examiner

SYSTEM FOR ADJUSTING THE POSITION OF AT LEAST ONE SEAT COMPONENT OF A PASSENGER SEAT AND ASSOCIATED COMMON CONTROL UNIT

The invention relates to a system for adjusting the position of at least one seat component of a passenger seat and to an associated common control unit.

Passenger seats, aircraft passenger seats in particular, of this type are extensively used as seating in vehicles, especially that of aircraft in commercial flight operations. In order to increase seating comfort, especially in passenger airplanes for medium-distance and long-distance travel, several seat components are mounted in such a way that their position may be adjusted so that the aircraft passenger may achieve the highest degree of comfort in the case of specific seat components such the back rest, the seat component, and others.

Positioning mechanisms operated by electromotive means are widely used in order to make adjustment of the position of these components as simple and convenient as possible so that the aircraft passenger need only operate control elements in order to carry out adjustment measures.

As is known, for safety reasons the adjustable-position seat components must assume a predetermined initial (safety) position during specific stages of flight operation, such as takeoff and landing. It is desirable for such adjustment to be made in common for several seat components. It is necessary for this purpose for the controls of the individual aircraft passenger seats to be interconnected and to be connected to a generic control unit by a common control unit; this represents considerable planning and assembly cost, especially since these connections must be planned and installed individually from aircraft to aircraft.

Hence, the object of the invention is to prepare a generic system and an associated common control unit which eliminate the disadvantages of the prior art.

In particular, planning and assembly of such systems are to be simplified and accelerated. In addition, reliable operation is to be ensured over the long term. In one particular embodiment the potential applications of such systems are also to be increased, and especially diagnostic capabilities are to be provided in addition to the control capabilities.

This object is attained by the system specified in claim 1 and the common control unit specified in the coordinated claim. Specific embodiments of the invention are specified in the dependent claims.

In the case of a system for adjustment of the position of at least one seat component such as a head rest, back rest, seat component, leg rest or foot rest of a passenger seat, an aircraft passenger seat in particular, this object is attained by means of actuators, a seat control having at least one operating element to be actuated by the passenger being mounted locally on the passenger seat, and it being possible to transfer data among the seat controls of several passenger seats, preferably those of all the passengers of the vehicle, and a common control unit, including data relating to the position of the seat components and/or data relating to operation of the actuators, in that the seat control and the common control unit each have a data transmission unit for wireless data transfer.

The wireless data transmission claimed for the invention, at least that for individual sections, makes it possible to eliminate wire-bound electric lines and contact elements to be mounted directly on the passenger seat, and above all the associated connections and contact elements which may repeatedly cause problems in practical applications because of corrosion, contact breakage, and the like. Above all this eliminates costly mounting of connecting lines, which in accordance with the prior art must be run to each seat individually and connected to the seat control. In addition, the associated positioning of lines both differs among individual vehicle types and depends on the seating of the vehicle, which especially varies from aircraft company to aircraft company. The invention makes it possible optionally to mount the passenger seat together with the associated data transmission unit as a structural unit in the vehicle. This is of advantage especially in the case of aircraft.

Another advantage is represented by the fact that the data transmission rate selected may be very high and yet reliably operating and cost-effective transmission and reception elements may be employed for the data transfer unit of the aircraft passenger seat. The transmission and reception frequencies may be assigned as fixed values, and in particular may be determined before mounting of the aircraft passenger seat in the aircraft. As an alternative, it is also possible not to determine the transmission and reception frequencies until after the aircraft passenger seats have been installed in the aircraft. For example, they may be programmed into the respective seat control.

Both a frequency multiplexing process and a time multiplexing process may be considered for the wireless data transmission. In any event, it is preferable for it to be possible for the seat control of the aircraft passenger seat both to transmit and receive simultaneously. In one particular embodiment this applies to the common control unit as well.

It is advantageous for many applications for a specific sending frequency or an associated transmission channel to be assigned, for example, for sending of data from the common control unit or an associated sending channel. A specific time slot in which data relevant to the respective aircraft passenger seat may be transmitted may be reserved for each seat control at this frequency in a sort of time multiplexing process. It may be advantageous if an address field in which the addresses of the seats for which the transmitted message is intended is inserted upstream from the message transmitted by the common control unit. The seat controls receive this transmission channel and when, for example, control data for the actuators coincide in the address, accept the message intended for the controls.

The data transmitted to the seat controls by the common control unit relate above all to operation of individual or several actuators of the respective seat. This provision may be applied not only to assignment of a prescribed initial safety position but also for diagnostic purposes, for example, for checking the functionality of individual actuators. In addition, wireless data transmission may be employed to diagnose the seat control and/or to transmit updated control software to the seat control.

In one particular embodiment of the invention the data transmission unit of the seat control has both a reception element for wireless reception of data from the common control unit and a sending element for wireless transmission of data to the common control unit. This also makes it possible to transmit the current position of the seat components of a seat to the common control unit and also, for example, to display this position at this control unit, so that, for example, a flight attendant may read the associated information centrally from a display device. In addition, diagnostic data relating to the functionality of the actuators may be received, stored, and/or displayed in this common control unit.

By preference the data transmission unit of the common control unit has several reception elements preferably spatially separated from each other on the vehicle for wireless reception of data from the seat controls of the seats. This makes it possible to ensure high operational security with a relatively low transmission output. The reception elements may be in the form of relay stations which concentrate, optionally prepare, and/or intermediately store the data wirelessly received from the seat controls and forward them to the common control unit. The distributed reception elements may as a rule also be transmitted wirelessly by the common control unit, but by preference the reception elements are connected by a wire-bound data line to the common control unit, in particular by way of a stub cable or a closed circuit.

The wireless data transmission may be effected by way of radio waves, including microwaves, the transmission frequency by preference spaced a sufficient distance from the frequencies used for air traffic and control of the aircraft. Radio waves present the advantage that the data transmission is not significantly impaired by fouling of the transmission or reception elements or by their cover.

As an alternative or possibly even as a supplement, the wireless data transmission may be effected by optical data transmission, especially in the infrared wavelength range, for example, such transmission as complies with the standard of the Infra-red Data Association (IrDA). Optical signal transmission affords the advantage of high electromagnetic compatibility, that is, effects of interference with other systems of the vehicle are virtually eliminated, as a result of which optical signal transmission presents an advantage, especially in the case of systems claimed for the invention mounted in aircraft.

In one particular embodiment of the invention the common control unit has a display device on which the data received from the seat controls and/or the data to be transmitted to the seat controls may be displayed. By preference the arrangement of several or even all passenger seats in accordance with their actual arrangement in the aircraft may be shown. The aircraft passenger seats which are in the initial safety position prescribed for takeoff or landing, for example, may be marked green, and the other aircraft passenger seats in another color such as red. In this instance as well a critical operating condition such as diagnosis of a malfunction may be indicated by colored marking of a particular seat in diagnosis of the functionality of the aircraft passenger seat or its actuators.

By preference the common control unit has a touch screen by touching of which one or more aircraft passenger seats may be selected and their actuators may be operated or diagnosed or their software may be updated.

The invention also relates to a common control unit for a system claimed for the invention as described in the foregoing. The common control unit may be mounted in the center of the aircraft. As an alternative or in addition, the common control unit may also be portable; in particular, at least a part of a common control unit installed in the vehicle so as to be stationary may also be embodied in an additionally available portable device, such a portable common control unit at least having the capability of exchanging information by wireless means with the seat control of the individual seats.

As a supplement a portable common control unit may also have a wire-bound means of connection to an interface of the seat control in order to permit operation of the actuators and/or readout of diagnostic data from the control unit of a particular seat in the event of failure of wireless data transmission.

Other advantages, features, and details of the invention are specified in the dependent claims and the following description, in which several exemplary embodiments are described in detail with reference to the drawings. The features referred to in the claims and in the description may be essential to the invention either individually on in any combination.

Figure 1:
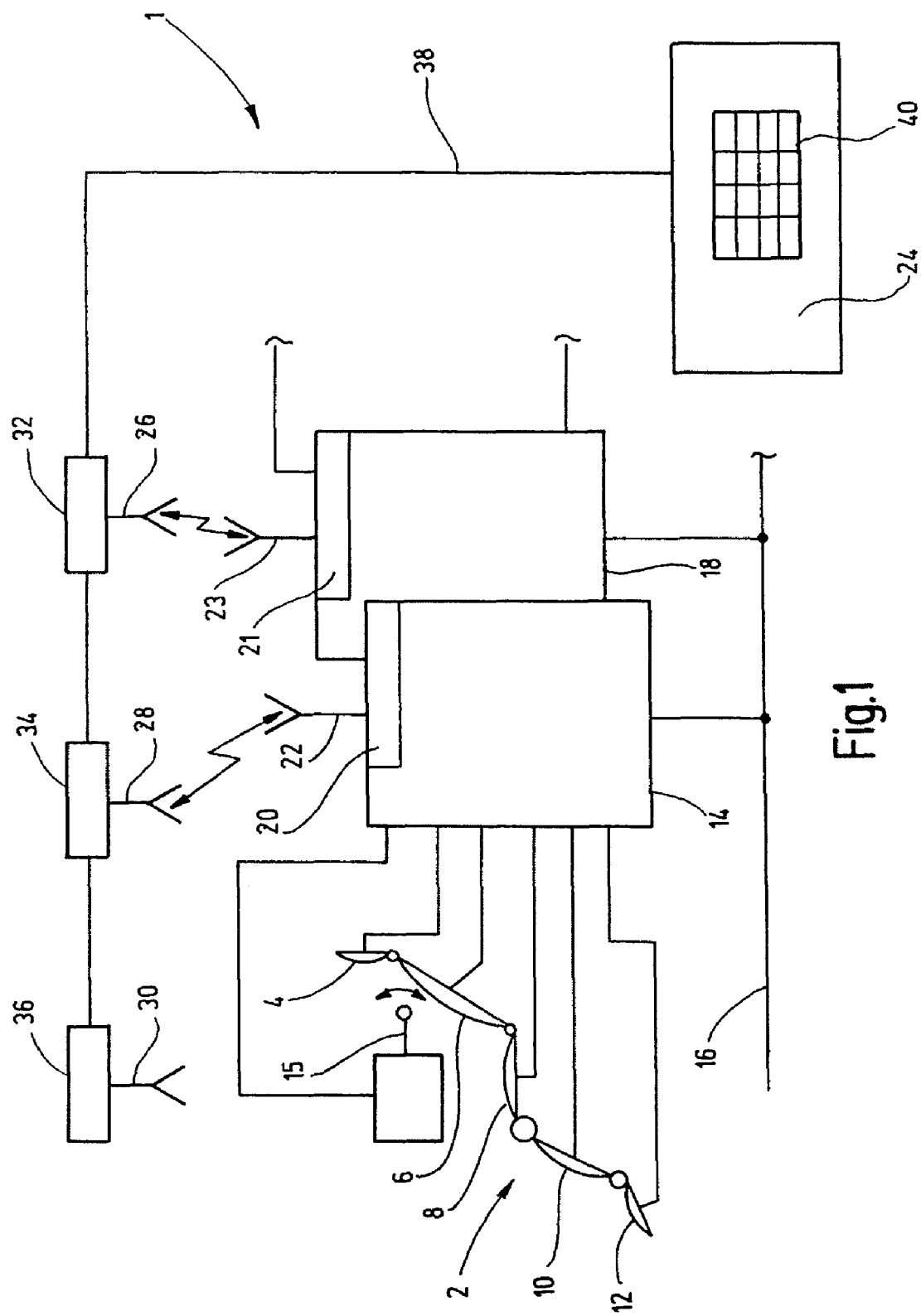
FIG. 1 illustrates a system claimed for the invention.

FIG. 1 illustrates a system 1 for adjusting the position of at least one seat component of an aircraft passenger seat 2 by means of actuators not shown. In the exemplary embodiment the positions of the head rest 4, back rest 6, seat component 8, leg rest 10, and foot rest 12 may be adjusted at the aircraft passenger seat 2, each by at least one actuator; the movements of the individual seat components may also be interconnected within assignable limits. The actuators are operated by a seat control 14 mounted locally on the aircraft passenger seat 2. This seat control 14 may be operated by an aircraft passenger by means of the operating element 15, for example, a joystick or control button. In addition to electronic control, the seat control 14 also has power electronic elements for operation of the actuators and in addition is connected to a power supply line 16.

Associated other seat controls 18 are likewise provided for the other aircraft passenger seats, ones which are also connected to the power supply line 16 and are more or less identical to each other and in particular are configured to be replaceable. Consequently, only the seat control 14 is described in greater detail in what follows.

The seat control 14 has a data transmission unit 20 which is connected to a sending and receiving antenna 22. In this way data relating to the position of the seat components and/or data relating to operation of the actuators may be transmitted between the seat controls 14, 18 of several aircraft passenger seats 2 and a common control unit 24.

In the exemplary embodiment illustrated the common control unit 24 has separately mounted sending and receiving reception elements 26, 28, 30 which are part of the separately mounted data transmission unit 32, 34, 36 of the common control unit 24. In particular, each of the sending and receiving units 26, 28, 30 is associated with a relay station; in the illustration in FIG. 1 these sending and receiving elements are integrated into the parts of the data transmission unit 32, 34, 36 and are connected by wire by way of a stub cable 38 to the common control unit 24. At the relay stations both the data received by the common control unit 24 are prepared for transmission to the antennas 22 of the seat control 14, and in particular are amplified, and, conversely, the data received by the antennas 22 of the seat controls 14 are amplified and sent over the connecting line 38 for forwarding to the common control unit 24.

The antenna 22 may, for example, send data of the seat control 14 relating to the current position of the seat components of the aircraft passenger seat 2 to the antenna 28 so that these data may be displayed by a display device 40 of the common control unit 24, in particular by a touch screen mounted there. The data transmitted by the antenna 22 of the seat control 14 may also be represented by diagnostic data relating to the operational status of the actuators associated with the seat 2. Similarly, the antenna 23 of the other seat control 18 may receive data from the transmission antenna 26 of the associated relay station, such as data relating to operation of the actuators of the seat associated with the other seat control 18.

The exemplary embodiment presented in FIG. 1 illustrates wireless data transmission by means of radio waves. It is possible in the process for the data transmission units 20, 21 of the seat controls 14, 18 each to send and/or receive on individual frequencies. This imposes higher requirements for the sending and receiving antennas 25, 28, 30 of the common control unit 24, which must be configured so that they are capable of receiving all the frequencies involved.

As an alternative to this frequency multiplexing transmission process, consideration may also be given to a time multiplexing transmission process in which a specific time slot in a time frame of 100 milliseconds, for example, is rigorously associated with each seat control 14, 18 and such association is firmly agreed upon in advance. Another possibility, which is to be given preference in many applications, is that of adding to each data packet to be transmitted an address and dispatcher field which both unequivocally identifies the dispatcher, such as the seat control 14, and clearly identifies the target or addressee, such as the common control unit 24.

In each of the transmission processes described in the foregoing the receiving antennas 26, 28, 30 and/or the relay station associated with them may in each instance provide for timing of data transmission on the connecting line. For example, each relay station may intermediately store the data received from the seat control 14, 18 and synchronously feed them to the connecting line 38, while simultaneously making certain that no signal collision occurs as a result of simultaneous accessing of the connecting line 38 by a plurality of relay stations 32, 34, 36 as a result of simultaneous transmission by a plurality of seat controls 14, 18.

The common control unit 24 may be operated or diagnosed by way of the connecting line 38 and wireless data transmission by way of individual actuators of specific seats 2. The functionality of the seat control 14, 18 may also be diagnosed. Potential causes of errors may be determined in this manner and displayed by the display device or indicated by another method. In addition, it is possible to call up modifications of the software of the seat controls 14, 18 at individual or all seat controls 14, 18 centrally by way of the common control unit 24.

As a variation of the transmission by radio waves shown in FIG. 1, wireless transmission by optical means is also possible, in particular in the infrared wavelength range. The sending and receiving elements of the seat control 14, 18 may by preference be mounted on the upper side of the back rest 6 or the head rest 4 in order to ensure connection as free from interference as possible with the receiving elements of the common control unit. The data transmission unit of the common control unit may be distributed when mounted, as is shown in FIG. 1. For example, the aircraft passenger seats 2 may each be associated with a data transmission unit 25, 28, 30. Such association may be permanently assigned or may be programmable, by preference into the set control 14, 18 and/or the common control unit.

Figure 2:
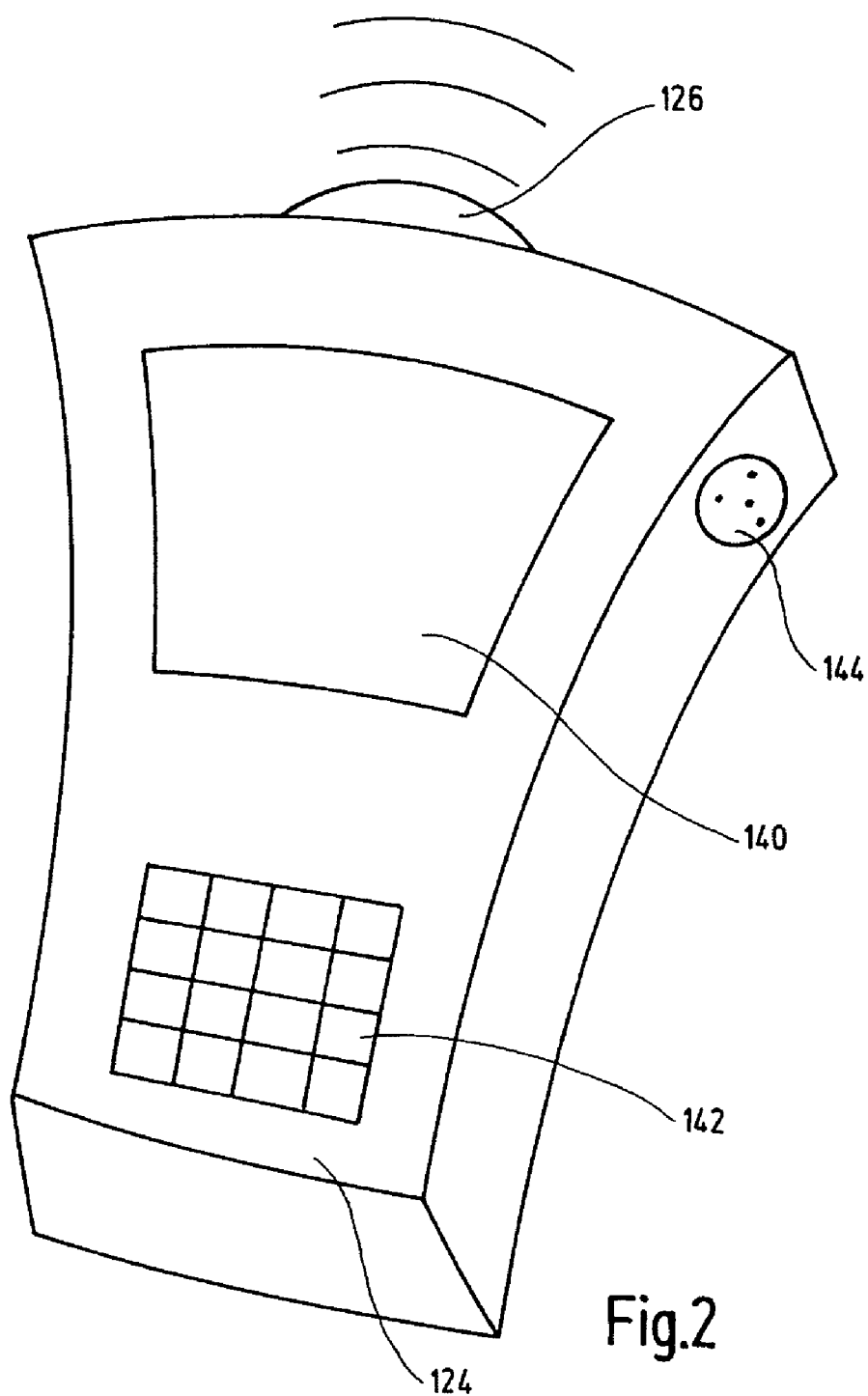
FIG. 2 illustrates a second exemplary embodiment of the common control unit claimed for the invention.

FIG. 2 illustrates a second exemplary embodiment of the common control unit 124 claimed for the invention, one which is portable and as a result may be brought, even by a flight attendant, for example, to the location of the seat control or the associated actuators of the respective aircraft passenger seat 2 to be controlled or diagnosed. For this purpose the portable common control unit 124 also has a display device 140, and it as well may be configured as a touch screen. As an alternative or in addition, the portable control unit 124 has additional input means 142, such as a keyboard, a touch pad, or the like. For the purpose of wireless data transmission the portable control unit 124 has on its front side a send and receive diode 126 for optical signal transmission in the infrared wavelength region, in particular a light emitting diode for sending and a photodiode for receiving. As a supplement to wireless data transmission, the portable control unit 124 also makes it possible to produce a wire-bound connection by means of the plug connection 144 and an associate connecting cable for the purpose of data transmission by the seat control 14, 18 of the respective aircraft passenger seat 2.

The invention claimed is:

1. A system for adjusting the position of at least one seat component of a passenger seat in an ensemble of passenger seats, the system being installed in a cabin of an aircraft, wherein the passenger seats are each provided with at least one actuator for adjusting the position of the seat component, the system comprising:
 a plurality of seat controls, which are respectively mounted locally on the passenger seats, wherein each seat control operates a corresponding one of the actuators,
 includes at least one operating element, by which a passenger can operate the corresponding seat control, and
 includes at least one data transmission unit; and
 a common control unit, which is installed in the aircraft and is common to the seat controls and includes at least one data transmission unit, provided for data transfer with the data transmission units of the seat controls, wherein the data transmission units of the seat controls and the at least one data transmission unit of the common control unit perform wireless data transfer between the common control unit and the seat controls, the data relating to a position of the at least one seat component and to operation of the actuators, and wherein the wireless data transfer is effected by radio waves.

2. A system according to claim 1, wherein
the at least one data transmission unit of the seat controls has both a receiving element for wireless reception of data from the common control unit and a sending element for wireless sending of data to the common control unit.

3. A system according to claim 1, wherein
the data transmission unit of the common control unit has a plurality of receiving elements mounted so as to be spatially separated in the vehicle for wireless reception of data from the seat controls of the passenger seats.

4. A system according to claim 3, wherein
relay stations and/or the receiving elements associated with the receiving elements provide for timing of data transmission to the common control unit.

5. A system according to claim 3, wherein
the receiving elements are connected to relay stations, which amplify the data received by wireless means from the seat controls and transmit the data farther to the common control unit.

6. A system according to claim 3, wherein
the receiving elements are connected to the common control unit by way of a wire data line.

7. A system according to claim 1, wherein
the common control unit has a display device on which the data received from the seat controls and/or data to be sent to the seat controls may be displayed.

8. A system according to claim 1, wherein
the common control unit has a touch screen by which one or more passenger seats may be selected.

9. A system according to claim 1, wherein
the common control unit is portable.

10. A system according to claim 1, wherein
data representing the current position of a seat component of a passenger seat are transmitted to the common control unit.

11. A system according to claim 10, wherein
the common control unit comprises a display device on which said current position of said seat component is displayed.

12. A system according to claim 1, wherein diagnostic data of at least one of the seat controls are transferred to the common control unit, and the diagnostic data relate to the functionality of at least one of the actuators of one of the passenger seats associated with the at least one of the seat controls.

13. A system according to claim 1, wherein diagnostic data relating to the functionality of at least one of the seat controls are transferred to the common control unit.

14. A system according to claim 1, wherein updated control software is transmitted from the common control unit to at least one of the seat controls.

15. A system according to claim 1, wherein a frequency of the radio waves is separated an adequate distance from the frequencies employed for aircraft traffic and for control of the aircraft.

16. A control apparatus for adjusting the positions of seat components of passenger seats in a plurality of passenger seats, the control apparatus being installed in a cabin of an aircraft, wherein the passenger seats are provided with at least one corresponding actuator for adjusting the position of a corresponding one of the seat components, the apparatus comprising:
a plurality of seat controls, which are respectively mounted locally on each passenger seat of the plurality of passenger seats, wherein each seat control controls the corresponding actuator in response to passenger operations and includes at least one seat control data transmission unit;
a common control unit, is installed in the aircraft and which commonly controls the plurality of seat controls and includes at least one common control data transmission unit for performing data transfer with the seat control data transmission units, wherein the seat control data transmission units and the common control data transmission unit communicate wirelessly, and wherein the wireless data transfer is effected by radio waves.

17. A system for adjusting the position of at least one seat component of a passenger seat in an ensemble of passenger seats, the system being installed in an aircraft cabin, wherein the passenger seats are each provided with at least one actuator for adjusting the position of the seat component, the system comprising:
a plurality of seat controls, which are respectively mounted locally on the passenger seats, wherein each seat control operates a corresponding one of the actuators,
includes at least one operating element, by which a passenger can operate the corresponding seat control, and
includes at least one data transmission unit; and
a common control unit, which is installed in the aircraft and is common to the plurality of seat controls and includes at least one data transmission unit, provided for data transfer with the data transmission units of the seat controls, wherein the data transmission units of the seat controls and the at least one data transmission unit of the common control unit perform wireless data transfer between the common control unit and the seat controls, wherein
the data transmission unit of the common control unit has a plurality of elements for data receiving and data sending mounted so as to be spatially separated in the aircraft cabin for wireless reception of data from the seat controls of the passenger seats; and the wireless data transfer is effected between one of the data receiving and data sending elements and a corresponding one of the seat controls by means of radio waves.

18. A system for adjusting the position of at least one seat component of a passenger seat in an ensemble of passenger seats, the system being installed in an aircraft cabin, wherein the passenger seats are each provided with at least one actuator for adjusting the position of the seat component, the system comprising:
a plurality of seat controls, which are respectively mounted locally on the passenger seats, wherein each seat control
operates a corresponding one of the actuators,
includes at least one operating element, by which a passenger can operate the corresponding seat control, and
includes at least one data transmission unit; and
a common control unit, which is installed in the aircraft and is common to the plurality of seat controls and includes at least one data transmission unit, provided for data transfer with the data transmission units of the seat controls, wherein the data transmission units of the seat controls and the at least one data transmission unit of the common control unit perform wireless data transfer between the common control unit and the seat controls,
wherein the data transfer uses a time multiplexing transmission process in which a communication with the seat controls is effected respectively during time slots which are each reserved inside a time frame uniquely for a respective one of the seat controls,
wherein the common control unit has a display device on which the data received from the seat controls and data to be sent to the seat controls may be displayed, and the display device displays the arrangement of several passenger seats in accordance with their actual arrangement in the aircraft and displays the current position of the seat components of at least one of the passenger seats, and
wherein the display device marks aircraft passenger seats which are in an initial safety position prescribed for takeoff or landing and marks the other aircraft passenger seats in a different manner.

19. A system according to claim 18, wherein the data transmission units of the seat controls each have both a reception element for wireless reception of data from the common control unit and a sending element for wireless transmission of data to the common control unit.

20. A system according to claim 18, wherein: diagnostic data of a seat control are transferred to the common control unit, the diagnostic data relate to the functionality of at least one of the actuators of one of the passenger seats associated to the at least one of the seat controls; and the display device marks said at least one of the passenger seats when a malfunction of said at least one of the passenger seats or said at least one of the actuators of said at least one of the passenger seats is diagnosed.

21. A system according to claim 1, wherein the data transmission units of the seat controls each have both a reception element for wireless reception of data from the common control unit and a sending element for wireless transmission of data to the common control unit.

22. A system according to claim 16, wherein the data transmission units of the seat controls each have both a reception element for wireless reception of data from the common control unit and a sending element for wireless transmission of data to the common control unit.

23. A system according to claim 1, wherein data transmitted to the seat controls by the common control unit related to an assignment of a predetermined initial safety position of the respective seat by at least one actuator, during specific stages of flight operation.

* * * * *